Figure 1:
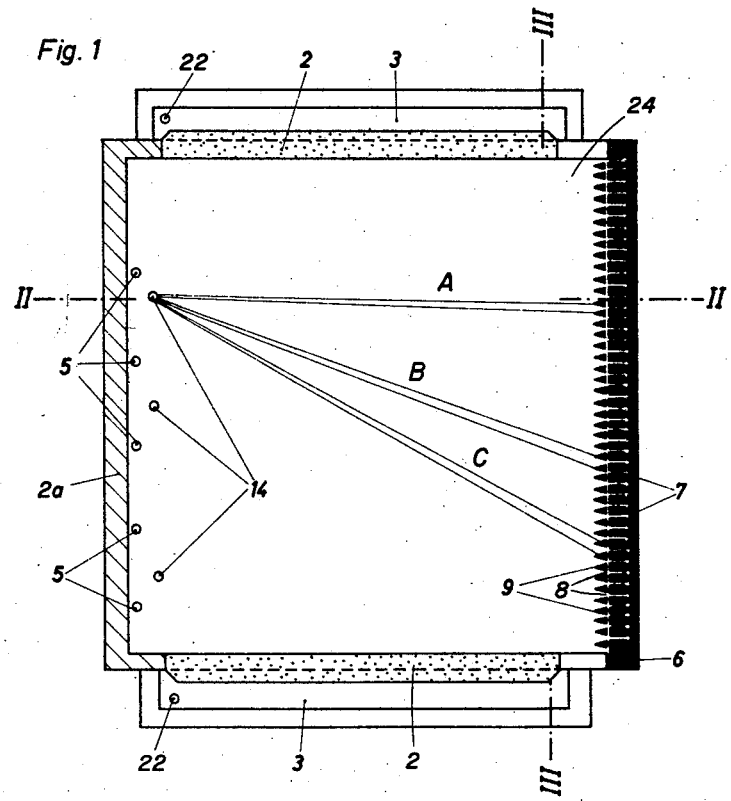

INVENTORS
WOLFGANG GRASSMANN
KURT HANNIG

BY Hammond & Littell
ATTORNEYS 3,125,500
DEVICE FOR THE EXECUTION OF THE CARRIER FREE CONTINUOUS ELECTROPHORESIS
Wolfgang Grassman, Jungwirthstrasse 10, Munich, Germany, and Kurt Hannig, Pentenriederstrasse 45, Planegg, near Munich, Germany
Filed Apr. 4, 1961, Ser. No. 100,665
Claims priority, application Germany Apr. 5, 1960
14 Claims. (Cl. 204—299)

The present invention relates to a device for the execution of the carrier-free continuous electrophoresis, in which the buffer solution is fed between two glass plates arranged at a small distance from each other, which can be refrigerated from the outside and which has means for a uniform feed and withdrawal of the flowing medium along the opposite edge of the glass plates. One or several openings in one of the glass plates for adding the substance to be separated is provided. Simultaneously an electric field directed normally to the flow direction of the buffer solution is maintained, whereby the electrodes, to which the voltage maintaining the field is applied, are in electrode spaces arranged along opposite edges of the glass plates, which spaces are separated from the interspace in which the buffer solution flows by an absorbing sealing material. The buffer solution flows likewise through the said electrode spaces.

In a known device for the execution of the carrier-free continuous passage electrophoresis, in which a buffer solution flows freely between two glass plates, this buffer solution is withdrawn after having flowed through the separation space over strips of cellulose of about 10 mm. width and 30 to 50 mm. length arranged at the end of the device.

The advantage of a carrier-free electrophoresis is seen in the fact that the absorption of the substances to be separated on the carrier material, can be avoided as far as ever possible. This possible advantage is, however, lost again to a far extent in the known device by which the withdrawal of the buffer solution takes place over a layer of the carrier material (cellulose) of a length of several inches.

Furthermore the passage speed of the buffer solution is limited and diminished because of the cellulose wicks arranged at the end of the device for withdrawal because of the absorptivity of the wicks and the free choice of the flow velocity of the buffer important for continuous electrophoresis is strongly limited.

There is the further point that the withdrawal of the buffer solution depends upon the absorptivity and dripping speed of each single strip which are always different, so that a uniform and completely parallel flow of the buffer solution through the separating space and a uniform filling of all withdrawal vessels is never obtained.

Also the disturbing influences of the electro osmosis and of the adsorption on the surface of the glass plates are not eliminated in the earlier known method.

It is an object of the invention to provide exactly determinable flow conditions in the separating space by a uniform withdrawal of the buffer solution at the end of the device for the carrier-free electrophoresis. A further object of the invention is to keep the other factors constant which determine the quantity passing and the separating performance of the device, as, for example, the surface quality of the limit of the separating space as well as the electric field.

According to the invention a uniform carrier-free withdrawal of the buffer solution is obtained by a withdrawal device, which has a plurality of webs arranged at a distance from each other along the rim of the glass plate, which webs determine the distance of the glass plates from each other, a vessel system connected with the rims of the glass plates, in which system always one vessel communicates with its neighboring vessel and a draining device for an intermittent separate and possibly automatic draining of the different vessels.

By means of this arrangement of the withdrawal device according to the invention at the end of the separating space it is now possible to execute the electrophoresis really carrier-free including the withdrawal of the buffer-solution. By the intermittent emptying of the single vessels it is obtained that the buffer solution flows absolutely uniformly into the single vessels, as in these among themselves absolutely the same pressure conditions prevail. A distortion of the course of the flow as it would take place in continuous exhaustion by wicks or also by continuous suction of the separate vessels is positively prevented by the draining device according to the invention.

In order to effect the intermitting draining of the separate vessels preferably a draining device is made use of, according to the invention, which has for each of the vessels a capillary tube immerses in each vessel until it is above the upper bore connecting each of the vessels with the separating space, which capillary tube is connected with the other end to a suction device for the intermitting sucking.

By means of this arrangement the vessels can be emptied quickly by sucking down to a level, which is only slightly above the connection of the vessels with the separating space. Thus a sucking action on the buffer solution flowing in the separating space is avoided. Furthermore it is possible by means of this arrangement to suck air for a short period through the capillary tubes serving for the withdrawal after the emptying of the vessels, so that these tubes do not remain in a filled state and thus have no siphon effect on the contents of the vessel which fills up again after the sucking process.

It has been found suitable to make use of a sucking device having a container in which the capillary tubes are introduced in a sealed manner and in which there is for each capillary tube a separate reception container. This container can be connected to a vacuum pump or the like by means of a periodically controlled valve.

A further embodiment according to the invention for the intermittent draining of the small vessels consists in the fact that a similar system of capillary tubes as described above, which end each in their own receiving container and which are connected likewise to a suction device, are made to dip in the small vessels at intervals, e.g. by a tilting movement. After the draining of the small vessels this device is tilted back. Thus an intermitting draining can be effected without having to periodically control a suction valve. By this method, the suction can be continuously applied as, during the period in which the small vessels are not in connection with the capillary tubes, air is sucked therethrough.

It has been found that the exactness of the separating method can be considerably increased if the walls of the separating space, i.e. the inner sides of the glass plates are wet as little as possible by the buffer solution and the substance to be separated. Hereby the errors, viz. electro osmosis and adsorption, which are caused mainly by the absorptive qualities of the glass plates, are avoided to a far extent. An "Organo-Polysiloxan" lining on the sides of the glass plates facing the separating space has proved to be particularly advantageous.

Furthermore, in connection with the acceleration of the passage with a corresponding increase of the strength of a field, there is a development of gas, which causes, at the passage of the absorptive sealing material on the edge of the separating space and the flowing buffer solution in the separating space because of the potential kink arising by the different conductivity in these two fluids, a disturbing influence on the exactness of the result. Because of the space which the absorptive sealing material occupies, the concentration of the buffer solution per space unit of the electrode space is lower than that in the separating space. Therefore there is used according to the invention in the electrode spaces a stronger concentration of the buffer solution and furthermore the pressure in the electrode spaces is increased somewhat as compared with the pressure in the separating space, so that:

(1) The concentration of the buffer solution in the absorptive sealing material and in the separating space, as compared to the electrode space unit, is about the same and (2) By the increase pressure in the electrode space it is avoided that the buffer solution of lower concentration flowing in the separating space dilutes the buffer solution of higher concentration in the absorptive sealing material.

In order to take advantage of the increase of the throughput possible by the draining device according to the invention the distance of the plates, which determines the separating space can be increased considerably above the dimensions considered as possible up to now. It was shown that with such an increase of the distance of the plates a sufficient separating performance can be reached if the flowing buffer solution has about the same specific weight as the solution of the substance to be separated. Therefore in these cases, where necessary, the transport liquid (buffer solution) can be brought to about the same specific weight as the substances to be separated by the addition of specifically heavy substances which can be mixed with the buffer solution and which are preferably volatile and not or only little conductive.

Figure 2:
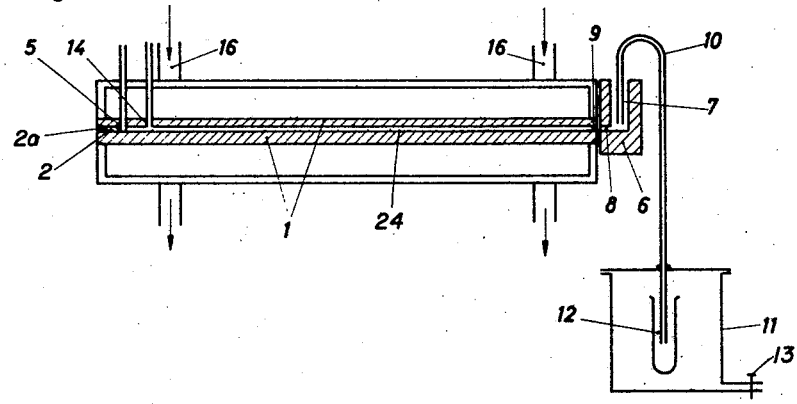
Figure 3:
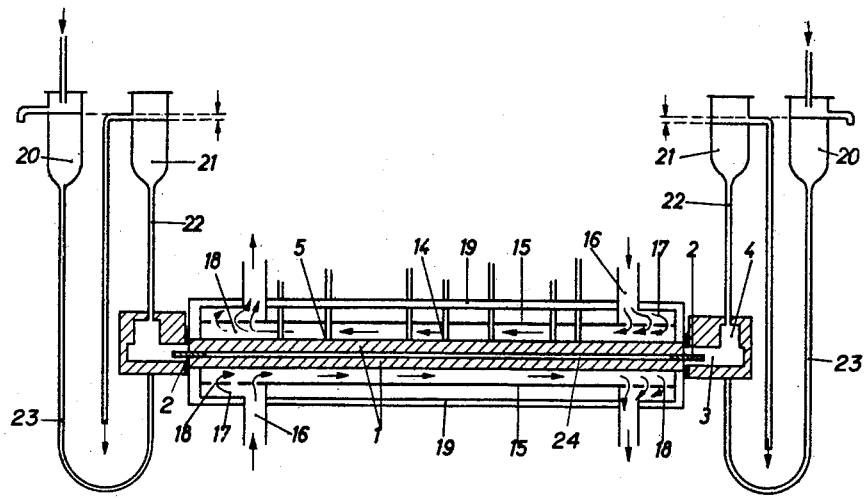
Figure 4:
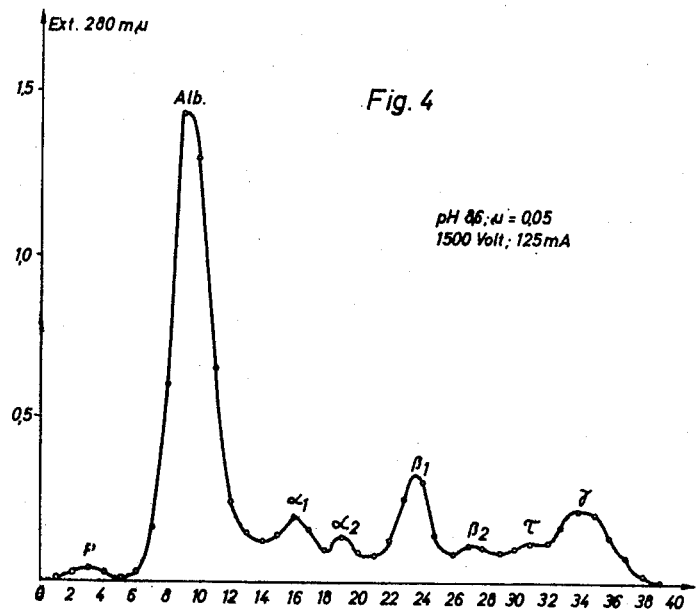

On the basis of the accompanying figures the invention will be explained in detail:

FIG. 1 shows a section through a device according to the invention through the middle plane of the separating space, FIG. 2 shows a section along the line II—II, FIG. 3 shows a section along the line III—III of FIG. 1, and FIG. 4 shows the curve which is obtained when a serum is separated with the aid of the apparatus of FIGS. 1–3.

Two absolutely flat and horizontally arranged glass plates 1, of, for example, a surface of 500 x 500 mm. and a thickness of the plates of 6 mm. are held in a filtering card board 2 cut in a U-shaped section, at a suitable distance, for example, 0.6 mm.

In the hatched parts of the drawing 2a the filtering card board strip is made impermeable by impregnating with hot paraffin. In the dotted parts it is absorptive and makes possible the current contact between the electrode spaces 3, the platinum electrodes 4 and the separating space 24 enclosed by the two glass plates. The transport medium, a flowing buffer solution, is fed in by the openings 5 on the upper rim of the plate, at about six locations by means of a suitable pumping device (e.g. a dosing pump) with any constant speed which can be chosen, so that the space 24 between the glass plates on the one hand and the limiting filter cardboard 2 on the other hand is filled with buffer solution which flows uniformly through the said space. The withdrawal of the buffer solution at the end opposite to the feeding end of the plates is done by a draining device 6, which represents in principle a plurality of small communicating vessels. This device consists of a small dam, e.g. of plastic material (polyvinylchloride) with e.g. 50 bores 7 (diameter 8 mm., depth 30 mm.) and the same number of bores 8 of about 3 mm. diameter arranged normally to them. Together with the small bores the draining device is pressed on the edges of the plates over a sealing of soft material (e.g. rubber) so that the electrolyte solution flowing between the two glass plates can enter into the small bores and can fill the vessels 7 formed by the large bores. Between the two glass plates there are arranged at the draining location small webs 9 between the bores in order to maintain exactly the correct separation of the plates. As the vessels, formed of the large bores, are in communicating connection with each other through bores 8 and the separating space 24, they must be filled necessarily to the same level and with the same volume corresponding to the flow rate of the buffer solution (if the draining dam is arranged exactly horizontally). Thus the presupposition of a completely uniform flow is necessarily obtained within the separating space. In order to maintain a continuous operation, provision must be made that the small vessels when they are filled nearly up to their rim, can be emptied quickly and uniformly. The filling must not be too high because otherwise by the hydrostatic pressure the two plates are varied with regard to their distance, so that not uniform conditions are created. The emptying shall thus be made as often as possible. This can be done by a suction device consisting of capillary tubes 10 which end in a closed vessel 11, in which there are about 50 receiving glasses 12 (test tubes) of a suitable volume, in the openings of which the ends of the draining tubes 10 discharge. When the receiving vessels 8 in the draining device are filled, the vessel 11 is quickly evacuated through valve 13, controlled by a time piece or also by a light responsive electric control by means of a magnetic valve 13 connected with a vacuum source. The small draining vessels 8 are in this case emptied quickly in this manner. When empty air is sucked through the tubes 10 and thus a possible siphon effect of the thin capillary tubes is prevented. This process is repeated at regulated intervals as often as necessary. The casing of container 11 is provided with a small aperture which is of such size that it permits sufficient outside air to enter container 11 in the event that closed valve 13 has minor leaks, but does not allow enough outside air to enter container 11 and destroys the vacuum when valve 13 is open. The mixture of substances to be separated is fed into the separating space 24 by one of the provided openings 14. After passing through the separating space 24 and its electrophoretic deflection, the single components A, B, and C of the mixture are collected in the receiving glasses 12 together with the transport liquid in equal volume in each of the 50 receiving glasses 12. The elimination of the Joule heat is made in the embodiment according to the illustration by blowing refrigerated air ($-10$ to $-20°$ C.) on both glass plates. For this purpose two cooling jackets 15 of plastic material are pressed on the two glass plates, which distribute the cooling air uniformly on the plates through the air feed 16 to distributor tubes 17 with bores 18. For insulation a further jacket 19 is applied over the actual refrigerating jacket.

In order to avoid the undesirable flowing in or out of buffer solution into the separating space 24 from the electrode spaces and vice versa (over the filter paper strips 2), the pressure conditions in the electrode spaces must be adapted to those in the separating space, whereby a small overpressure in the electrode spaces is adjusted. This is achieved by corresponding leveling containers 20 and 21 at the feeding and draining (23 and 22) of the electrode rinsing liquid (cf. FIG. 3).

An increase of the plate distance and thus an increase of the through-put performance is possible only, if according to the invention the specific weights of the solution to be separated and of the transport liquid are made absolutely the same. This can be made e.g. by additions of heavy molecules into the transport liquid.

*Example 1*

In the described arrangement it was possible e.g. with a field strength of 40 volt/cm. and a current of 3 ma./cm. in the presence of a veronal buffer of pH 8.6 and the ion strength $=0.005$ to separate 13 cm.$^3$ of serum per day, which represents about 1 gram protein per day with an excellent separating sharpness. The passage time of the buffer film was in the case of this experience 75 minutes.

The spectrum of the separated serum proteins extended to 38 cm. The good separation of a serum in its components is shown in the accompanying FIGURE 4.

*Example 2*

Separation of a mixture of rabbit and human erythrocytes. As an example for the suitability of the continuous free electrophoresis arrangement for separating substance mixtures with large particle size washed rabbit and human erythrocytes were separated in an isotonical buffer of pH 7.2 (0.25 m. sodium phosphate+5.4% glucose solution 1:5). In this experience the separation chamber was inclined by 45° downwardly in order to avoid a sedimentation of the erythrocytes on the lower glass plate. In case of a horizontal position of the glass plates the fed erythrocytes mud sedimented on the lower glass plate and is kept there. The applied voltage was 2000 volt, 180 ma., passage speed 2.5 cm. per minute. This illustration shows that it is readily possible with the draining device according to the invention to separate also such substance mixtures with extremely big particle size.

We claim:

1. Apparatus for continuous free-flow electrophoresis comprising two rectangular plates of non-conductive material in spaced alignment to each other forming a separating space; a pair of electrode chambers, each tightly connected to one of a pair of opposite edges of said plates and communicating with said separating space between said plates through a strip of porous material clamped between the marginal section of said plates; each of said electrode chambers enclosing at least one electrode electrically connected to the output of a D.C.-source; a third marginal section of said separating space being tightly sealed between said electrode chambers; at least one connection to a feed inlet for supply of buffer solution to said separating space adjacent to said third marginal section; means for introducing material to be electrophoretically separated into said separating space between said plates adjacent to said third marginal section; the marginal space opposite said feed inlet connections being closed by a horizontal bar having a plurality of outlets arranged at regular intervals over its entire length between said electrode chambers communicating with a plurality of receptacles, each of said outlets extending from the inner separating space between said plates to its paired outer receptacle for collecting buffer solution flowing out of said outlet whereby each of said receptacles is in liquid connection; means for supplying buffer solution to said feed inlet connections; and means for intermittently withdrawing electrophoretically separated material and buffer solution from each of said collecting receptacles simultaneously and in equal volume in ratio to the flow rate through said separating space.

2. Apparatus for continuous free-flow electrophoresis comprising two rectangular glass plates spaced from each other in circumferential alignment forming a separating space; an electrode chamber tightly connected to each of two opposite edges of said plates and communicating with the separating space between said plates through a strip of porous material clamped between the marginal sections of said plates; each of said electrode chambers enclosing at least one electrode electrically connected to the output of a D.C.-source; a third marginal section of said separating space between said electrode chambers tightly sealed; at least one connection to a feed inlet for supply of buffer solution to said separating space adjacent to said third marginal section; means for introducing material to be electrophoretically separated into said separating space between said glass plates adjacent to said third marginal section; the marginal space opposite said feed inlet connections being closed by a horizontal bar having a plurality of outlets arranged at regular intervals over its whole width between said electrode chambers communicating with a plurality of receptacles, each of said outlets extending from the inner separating space between said plates to its paired outer receptacle for collecting buffer solution flowing out of said outlet, all of said collecting receptacles standing in communicating connection with each other; means for supplying buffer solution to said supply feed inlet connections; and means for intermittently withdrawing electrophoretically separated material and buffer solution from each of said collecting receptacles simultaneously and in equal volume in ratio to the flow rate through said separating space.

3. The apparatus of claim 2 wherein said horizontal bar has a portion adjacent outside said edges of said plates, said collecting receptacles being cylindrical bores of relatively large diameter in said outside portion of said bar and said outlets being bores of relatively small diameter.

4. Apparatus for continuous free-flow electrophoresis comprising two rectangular glass plates spaced from each other in circumferential alignment forming a separating space; an electrode chamber tightly connected to each of two opposite edges of said plates and communicating with the separating space between said plates through a strip of porous material clamped between the marginal sections of said plates; each of said electrode chambers enclosing at least one electrode electrically connected to the output of a D.C.-source; a third marginal section of said separating space between said electrode chambers tightly sealed; at least one connection to a feed inlet for supply of buffer solution to said separating space adjacent to said third marginal section; means for introducing material to be electrophoretically separated into said separating space between said glass plates adjacent to said third marginal section; the marginal space opposite said feed inlet connections being closed by a horizontal bar having a plurality of outlets arranged at regular intervals over its whole width between said electrode chambers communicating with a plurality of receptacles, each of said outlets extending from the inner separating space between said plates to its paired outer receptacle for collecting buffer solution flowing out of said outlet, all of said collecting receptacles standing in communicating connection with each other; means for supplying buffer solution to said supply feed inlet connections; means for intermittently withdrawing electrophoretically separated material and buffer solution from each of said collecting receptacles simultaneously and in equal volume in ratio to the flow rate through said separating space, said means for withdrawing the separated material and buffer solution consisting of a vacuum chamber enclosing containers, said collecting receptacles being in vacuum connection with said containers by means of capillary tubes the high pressure ends of which are arranged within said collecting receptacles above the entry of said outlets; and means for intermittently applying vacuum to said vacuum chamber.

5. Apparatus for continuous free-flow electrophoresis comprising two rectangular plates of non-conducting material in spaced alignment to each other forming a separating space; a pair of electrode chambers, each tightly connected to one of a pair of opposite edges of said plates and communicating with said separating space between said plates through a strip of porous material clamped between the marginal section of said plates; each of said electrode chambers enclosing at least one electrode being electrically connected to the output of a D.C.-source; a third marginal section of said separating space being tightly sealed between said electrode chambers; at least one connection to a feed inlet for supply of buffer solution to said separating space adjacent to said third marginal section; means for introducing material to be electrophoretically separated into said separating space between said glass plates adjacent to said third marginal section; the marginal space opposite said third marginal section being closed off by a horizontal bar having a plurality of outlets arranged at regular intervals over its whole length between said electrode chambers communicating with a plurality of receptacles, each of said outlets extending from the inner separating space between said plates to its paired outer receptacle for collecting electrophoretically separated material and buffer solution flowing out of said outlet whereby each of said receptacles is in liquid connection; means for supplying buffer solution to said feed inlet; means for supplying buffer solution to the electrode chambers with such a pressure and such a concentration that the specific conductivity in said porous material is about the same as the specific conductivity in the buffer solution in said space; and means for intermittently withdrawing electrophoretically separated material and buffer solution from each of said collecting receptacles simultaneously and in equal volume in ratio to the flow rate through said separating space.

6. Apparatus for continuous free-flow electrophoresis comprising two rectangular plates of non-conductive material in spaced alignment to each other and in circumferential alignment forming a separating space; cooling chambers arranged on the outer surfaces of each of said plates, said cooling chambers being connected to a supply source of cooling medium and having an exhaust whereby a cooling medium can be passed over the outer surfaces of each of said plates; a pair of electrode chambers tightly connected to each of two opposite edges of said plates and communicating with the said separating space between said plates through a strip of porous material clamped between the marginal section of said plates; each of said electrode chambers enclosing at least one electrode electrically connected to the output of a D.C.-source to establish an electrical field across the space between said glass plates; a third marginal section of said separating space between said electrode chambers being closely sealed; at least one connection to a feed inlet for supply of buffer solution to said separating space adjacent to said third marginal section; means for introducing material to be electrophoretically separated into said separating space between said glass plates adjacent to said third marginal section; the marginal space opposite said feed inlet connections being closed by a horizontal bar having a plurality of outlets arranged at regular distance over the whole width of the electrical field between said electrode chambers communicating with a plurality of receptacles, each of said outlets extending from the inner separating space between said plates to its paired outer receptacle for collecting electrophoretically separated material and buffer solution flowing out of said outlets whereby each of said receptacles is in liquid connection; means for supplying buffer solution to said feed inlet connections and said electrode chambers; and means for intermittently withdrawing electrophoretically separated material and buffer solution from each of said collecting receptacles simultaneously and in equal volume in ratio to the flow rate through said separating space.

7. Apparatus according to claim 1, wherein the surfaces of the plates forming said space are lined with a material which substantially decreases wetting of the plate surfaces by the buffer solution.

8. Apparatus according to claim 1, wherein the surfaces of the plates forming said space are lined with an organic polysiloxane.

9. Apparatus according to claim 3, wherein each of said bores of smaller diameter is connected to the associated collecting receptacle near the closed lower end of the receptacle.

10. Apparatus according to claim 4, wherein said vacuum chamber is connected to a vacuum pump through a valve which intermittently actuates a vacuum within said chamber at predetermined time intervals.

11. Apparatus according to claim 4, wherein said vacuum chamber is connected to a vacuum pump through an electrically controlled valve which intermittently actuates a vacuum within said chamber at predetermined time intervals.

12. Apparatus according to claim 4, wherein said vacuum chamber comprises at least one opening connecting the chamber with the atmosphere for throttled entrance of air in such an amount that full vacuum occurs only when the vacuum pump is fully effective on the chamber.

13. Apparatus according to claim 6, wherein said source of cooling medium is a source of cooled gas.

14. Apparatus according to claim 6, wherein said cooling chambers are connected with said source of cooling medium in such a manner that said cooling medium flows along the outer surface of one of the plates opposite to the direction of flow on the outer surface of the other plate.

References Cited in the file of this patent

UNITED STATES PATENTS

| | | |
|---|---|---|
| 2,555,487 | Hauggard et al. | June 5, 1951 |
| 2,879,141 | Skeggs | Mar. 24, 1959 |
| 2,884,367 | Karler et al. | Apr. 28, 1959 |
| 2,888,392 | Grassman et al. | May 26, 1959 |
| 2,896,787 | Roman | July 28, 1959 |
| 2,990,238 | Kabisch et al. | June 27, 1961 |

FOREIGN PATENTS

| | | |
|---|---|---|
| 1,066,180 | Germany | Oct. 1, 1959 |

OTHER REFERENCES

Lederer: Chromatographic Reviews, vol. 3, 1961, pages 63–66.